United States Patent
Stammers et al.

(10) Patent No.: US 11,178,067 B2
(45) Date of Patent: Nov. 16, 2021

(54) SERVICE ALLOCATION ACROSS MULTI-MANAGED HETEROGENEOUS NETWORKS

(71) Applicant: Cisco Technology, Inc., San Jose, CA (US)

(72) Inventors: Timothy Peter Stammers, Raleigh, NC (US); Richard Alan Galatioto, Cary, NC (US); Louis Gwyn Samuel, Swindon (GB); Oliver James Bull, Bristol (GB); Azita Ebrahimi Kia, Santa Barbara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 73 days.

(21) Appl. No.: 16/594,352

(22) Filed: Oct. 7, 2019

(65) Prior Publication Data

US 2021/0105225 A1    Apr. 8, 2021

(51) Int. Cl.
*H04L 12/927* (2013.01)
*H04L 12/851* (2013.01)
*H04L 29/08* (2006.01)

(52) U.S. Cl.
CPC ........ *H04L 47/805* (2013.01); *H04L 47/2425* (2013.01); *H04L 47/803* (2013.01); *H04L 47/808* (2013.01); *H04L 67/1097* (2013.01); *H04L 67/322* (2013.01)

(58) Field of Classification Search
CPC combination set(s) only.
See application file for complete search history.

(56) References Cited

U.S. PATENT DOCUMENTS

| 8,195,827 | B2 | 6/2012 | Strassner |
| 8,346,909 | B2 | 1/2013 | Dan et al. |
| 8,520,535 | B2 | 8/2013 | Dawson et al. |
| 9,419,859 | B2 | 8/2016 | Moscibroda et al. |
| 10,158,725 | B2 | 12/2018 | Narendra et al. |
| 10,212,053 | B2 | 2/2019 | Vasudevan et al. |
| 2011/0292832 | A1* | 12/2011 | Bottari ................ H04L 41/0896 370/254 |

(Continued)

*Primary Examiner* — Xavier S Wong
(74) *Attorney, Agent, or Firm* — Edell, Shapiro & Finnan, LLC

(57) ABSTRACT

Techniques are described to provide to provide service allocation across multi-managed heterogeneous networks. In one example, a method includes determining, by an application network policy controller, service information for an application, wherein the application communicates with an application server. The method may further include identifying one or more network domains of a plurality of network domains to provide network connectivity between the application and the application server based, at least in part, on service qualifiers and context information for the plurality of network domains and the service information for the application; generating an application policy for the application, wherein the application policy identifies, at least in part, the one or more network domains to provide network connectivity between the application and the application server; and communicating the application policy to the one or more identified network domains to provide network connectivity between the application and the application server.

20 Claims, 9 Drawing Sheets

(56) References Cited

U.S. PATENT DOCUMENTS

| | | | |
|---|---|---|---|
| 2012/0151209 A1* | 6/2012 | Visnyak | H04L 63/105 |
| | | | 713/166 |
| 2016/0267286 A1* | 9/2016 | Kodeswaran | H04L 63/04 |
| 2016/0314299 A1* | 10/2016 | Aimer | H04L 63/0428 |
| 2018/0316563 A1* | 11/2018 | Kumar | H04L 41/0853 |
| 2019/0052549 A1 | 2/2019 | Duggal et al. | |
| 2019/0132280 A1* | 5/2019 | Meuninck | H04L 12/66 |
| 2020/0257793 A1* | 8/2020 | Alzahrani | H04L 63/18 |
| 2020/0409620 A1* | 12/2020 | Alacar | H04L 63/0245 |

* cited by examiner

SERVICE ALLOCATION ACROSS MULTI-MANAGED HETEROGENEOUS NETWORKS

TECHNICAL FIELD

The present disclosure relates to network equipment and services.

BACKGROUND

Networking architectures have grown increasingly complex in communication environments, particularly in mobile wireless environments. In some cases, networking architectures can involve heterogeneous networks in which enterprises and service providers serve the same physical space. As the number of network subscribers increases and as heterogeneous networks become more prevalent, optimal allocation of network resources becomes more critical. Accordingly, there are significant challenges in allocating network resources in heterogeneous networks.

DESCRIPTION OF EXAMPLE EMBODIMENTS

Overview

Figure 1:
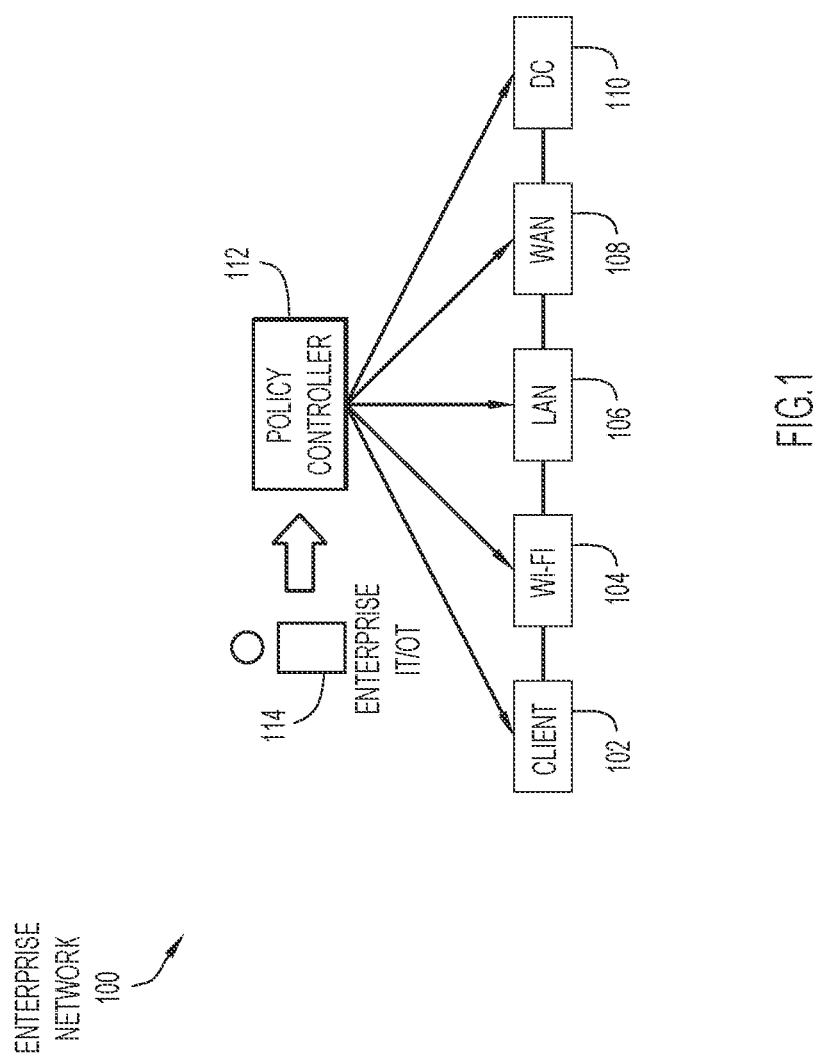
FIG. 1 is a conceptual illustration of an enterprise network, according to an example embodiment.

Combining multiple access methods within an enterprise environment creates a need to manage policy across the access methods. Moreover, with the increasing amount of overlay networking models, exposure of network capabilities and policy being applied across multi-managed heterogeneous networks that may include multiple network domains offers an opportunity to innovate and differentiate client to cloud networking capabilities. Techniques presented herein illustrate that interfacing the policy of an application network layer with multiple network domains of a multi-managed heterogeneous network may be used to facilitate and/or create new models of operation.

In an example embodiment, a method is provided that includes determining, by an application network policy controller, service information for an application, wherein the application communicates with an application server; identifying one or more network domains of a plurality of network domains to provide network connectivity between the application and the application server based, at least in part, on service qualifiers for the plurality of network domains, context information that characterizes network resources for the plurality of network domains, and the service information for the application, wherein each network domain comprises at least one policy controller, wherein the plurality of network domains comprise at least one enterprise network domain and at least one non-enterprise network domain and the application network policy controller is associated with at least one enterprise network domain; generating an application policy for the application, wherein the application policy identifies, at least in part, the one or more network domains to provide network connectivity between the application and the application server; and communicating the application policy to the one or more identified network domains to provide network connectivity between the application and the application server.

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Referring to FIG. 1, FIG. 1 is a conceptual illustration of an enterprise network 100, according to an example embodiment. For the embodiment of FIG. 1, enterprise network 100 may be illustrative of a wireless enterprise network, which includes client devices 102, Wi-Fi® access points (APs) 104, Local Area Network (LAN) nodes 106, Wide Area Network (WAN) nodes 108, data center (DC) nodes 110, and a centralized enterprise policy controller 112. In general, Wi-Fi APs 104 provide wireless connectivity to the network nodes for client devices 102. In some instances, Wi-Fi APs 104, LAN nodes 106, WAN nodes 108, and DC nodes 110 may be considered network domains including one or more network functions, devices, etc. within enterprise network 100. In other instances, enterprise network 100 may be considered a network domain.

In one implementation, enterprise network 100 may be implemented as a software defined network (SDN) in which policy is managed through enterprise policy controller 112. In some embodiments, enterprise policy controller 112 may be implemented as a Cisco® Digital Network Architecture Center (DNAC) or the like.

Enterprise information technology and/or operational technology (IT/OT) systems and/or administrators, or, more generally, an enterprise 114 defines how the enterprise network 100 is to behave and therefore sets policy rules within enterprise policy controller 112 that are to be enforced by the network functions across the network domain(s). During operation, enterprise policy controller 112 ensures consistent policy is applied end-to-end utilizing multiple technologies that are relevant to each domain. In various embodiments, these technologies may include overlay networks such as Virtual Extensible LAN (VXLAN), Internet Protocol (IP) security (IPsec), Segment Routing (SR), Network Service Header (NSH), Multiprotocol Label Switching (MPLS), etc.; Quality of Service (QoS) profiles and/or mapping between transport layers; access rules (e.g., authentication grant/deny rules); segmentation such as Virtual LAN (VLAN), etc.; client mobile device managers (MDM); security levels; and/or the like.

Figure 2:
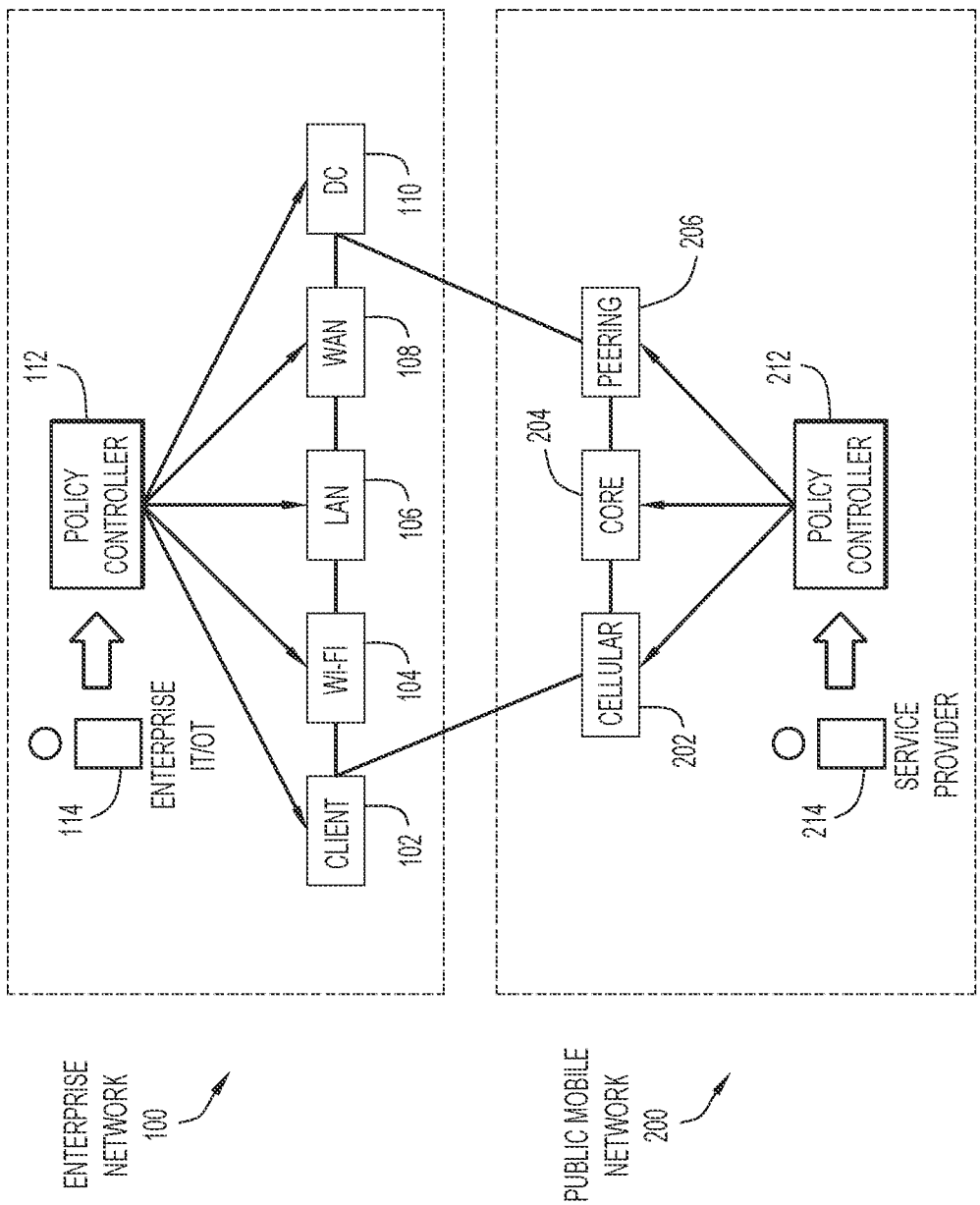
FIG. 2 is conceptual illustration of the enterprise network of FIG. 1 and a public mobile network, according to an example embodiment.

FIG. 2 is conceptual illustration of the enterprise network 100 of FIG. 1 and a public mobile network 200, according to an example embodiment. Public mobile network 200 may include cellular access points (APs) 202, mobile core network nodes 204, peering nodes 206, and a service provider (SP) policy controller 212. In general, cellular APs 202 provide cellular connectivity to mobile core network nodes 204, while peering nodes 206 may provide routing into enterprise network 100 via SP and/or Internet domains. For embodiments described herein, any mobile core network nodes (e.g., mobile core network nodes 204) may be implemented as any combination of 3rd Generation Partnership Project (3GPP)-based mobile core network nodes (e.g., 3rd Generation (3G) nodes, 4th Generation/Long Term Evolution (4G/LTE) nodes, and/or 5th Generation (5G) nodes).

In public mobile network 200, a service provider (SP) 214 defines the policy for SP policy controller 212. During operation, when a client device (e.g., client device 102) utilizes the public mobile network 200, it is the service provider 214 who defines and enforces the policy across their network via SP policy controller 212. As the public mobile network 200 is accessible by all public mobile network subscribers, the policy framework and enforcement points are designed for the services offered by the service provider, which primarily include voice, messaging, and data services. In general, the data services are balanced for equal utilization by all subscribers and therefore policy rules are defined to ensure fair sharing for all sub scribers.

Figure 3:
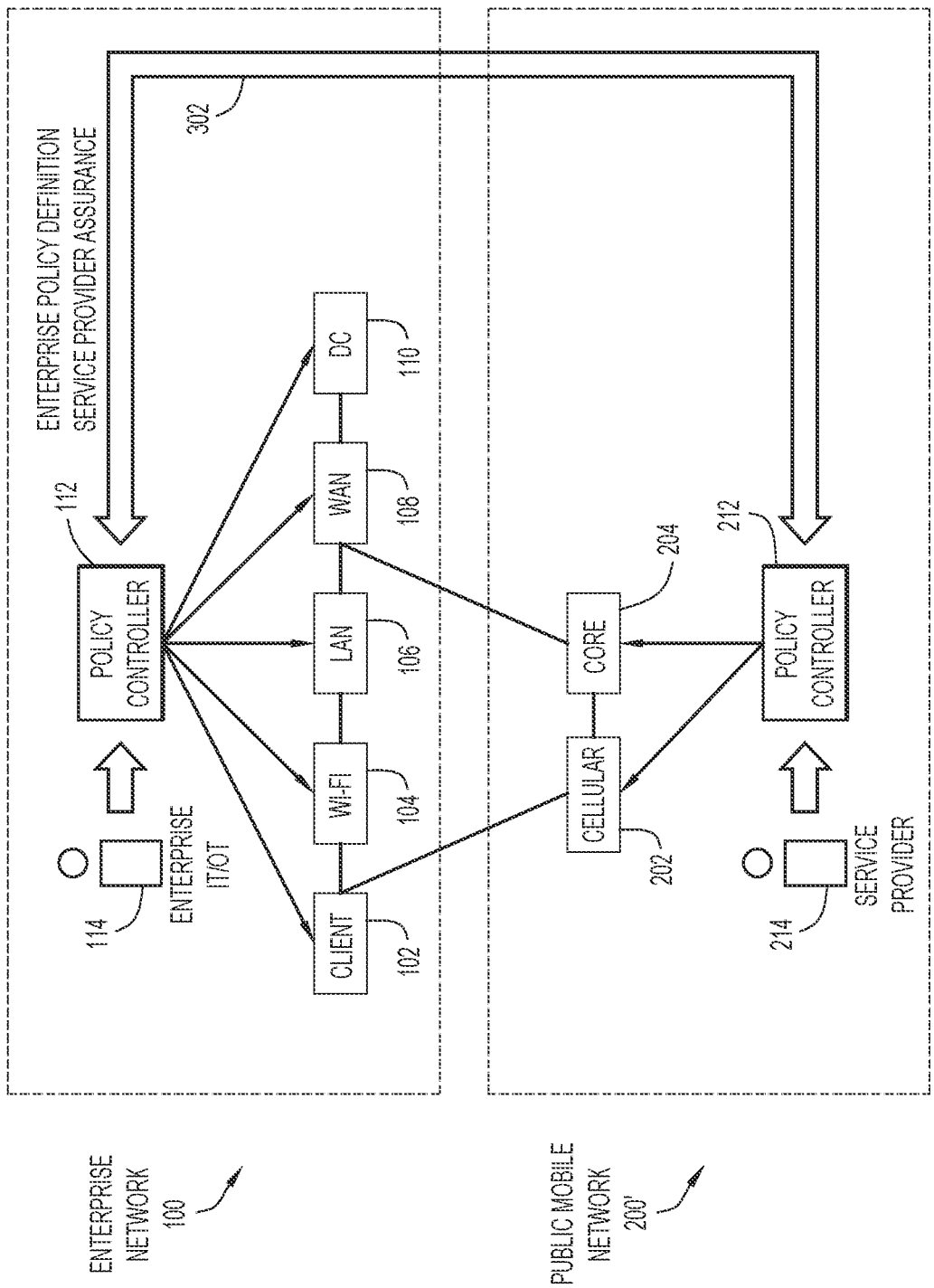
FIG. 3 is a conceptual illustration of a multi-managed heterogeneous network including the enterprise network of FIG. 1 and a private mobile network, according to an example embodiment.

FIG. 3 is a conceptual illustration of a multi-managed heterogeneous network 300 including the enterprise network 100 of FIG. 1 and a private mobile network 200', according to an example embodiment. Private mobile network 200' may include cellular APs 202 and mobile core network nodes 204.

With the advent of private mobile networks, such as private mobile network 200', there is a need for a service provider to apply enterprise defined policies, sometimes referred to as enterprise 'intent', to the private mobile network 200'. A benefit of private mobile network 200' is to allow the enterprise 114 to route traffic from the mobile core network nodes 204 into the enterprise network 100 directly, without having to traverse SP and/or Internet domains to land the traffic back into the enterprise network 100.

However, with the co-existence of enterprise-managed Wi-Fi access networks (e.g., Wi-Fi APs 104) and SP-managed Private 4G/LTE and/or 5G access networks (e.g., cellular nodes 202) serving the same physical space, it is important to ensure that for any given set of services, applications, etc., an optimal service allocation across the available wireless access is achieved. In current deployments, service allocations are possible in a static manner based on enterprise-managed clients for cases where the wireless environment is entirely managed by the enterprise or is entirely managed by a service provider.

For multi-managed environment such as multi-managed heterogeneous network 300 in which network domains may be managed by different entities, enterprise and non-enterprise, techniques are needed such that trustworthy assurance measurements supporting contracted service qualifiers are exchanged and then decisions may be provided by the enterprise based on that information to move or allocate services between technologies (e.g., between network domains).

Presented herein are techniques to provide an exchange (generally illustrated by bi-directional arrow 302) of enterprise policy definition(s) and service provider assurance information (or, more generally, service qualifiers) and context information between different network domains such as an enterprise network domain and a non-enterprise (e.g., service provider) network domain in order to fulfil an enterprise's Service Level Agreements (SLAs), monitoring services, performance metrics, security services, and/or the like. Such an exchange 302 may provide for integrating the private mobile network 200' policies, assurances, etc. into enterprise policy controller 112. With the private mobile network 200' integrated into the enterprise policy controller 112, the private mobile network becomes another network domain for the enterprise to apply such methods as; overlays, QoS mapping, access rules, segmentation, and/or client management, among others, to ensure consistent policy is applied end-to-end.

Once the capability for an exchange 302 between policy controllers for multiple network domains is available, it creates a 'hook' into the network domains to enhance application layer traffic management (e.g., via a mobile Software Defined WAN (mobile SD-WAN)) which can now include network context directly as opposed to relying on probe measurements, which are, by definition, reactive and unpredictable.

Figure 4:
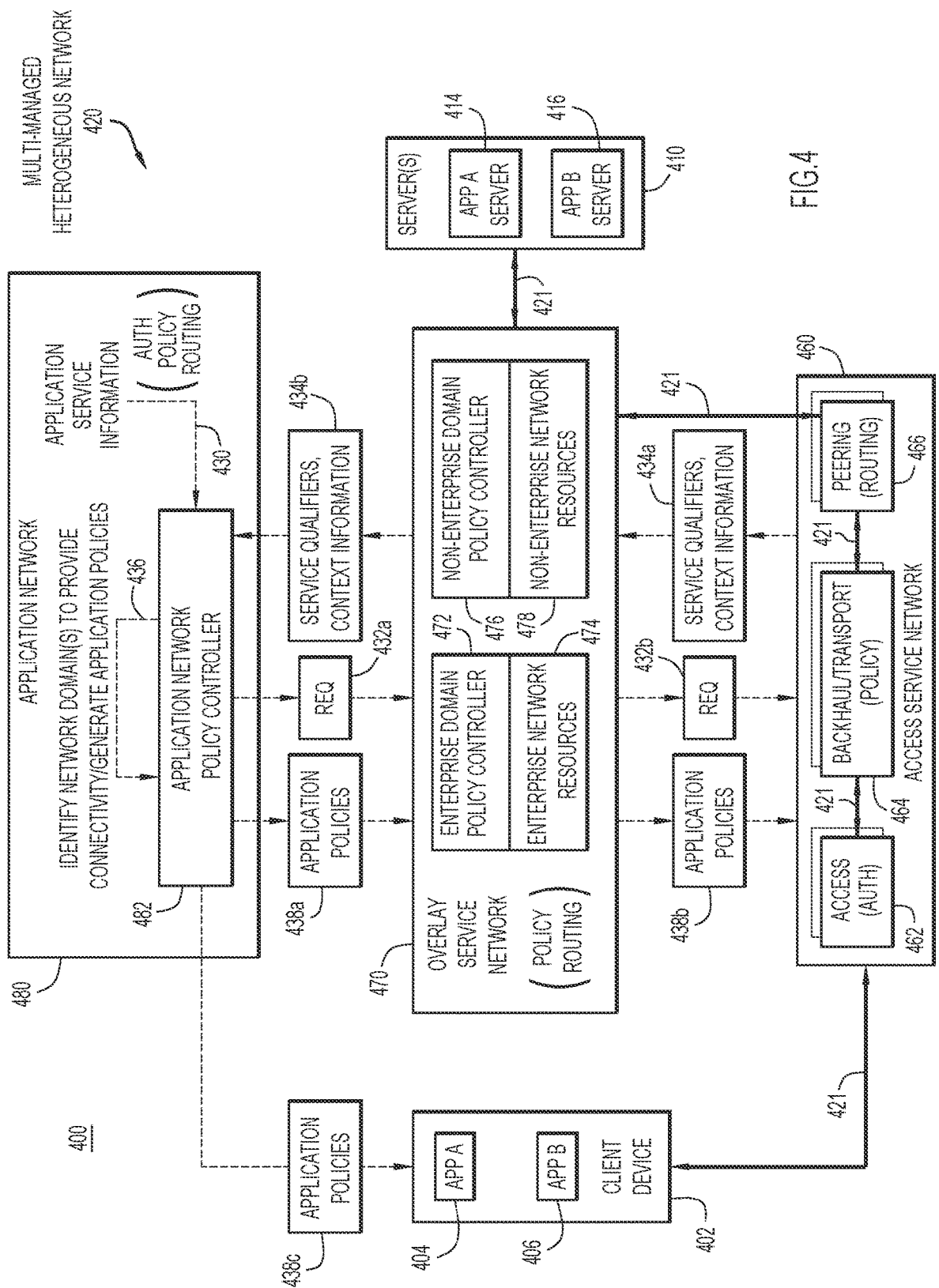
FIG. 4 is a block diagram of a system in which techniques for providing service allocation across a multi-managed heterogeneous network may be implemented, according to an example embodiment.

As illustrated in FIG. 4, a system 400 is provided in which techniques for providing service allocation across a multi-managed heterogeneous network 420 may be implemented, according to an example embodiment. Multi-managed heterogeneous network 450 may include a lower layer that may include an access service network 460 for multiple network domains, a middle layer that may include an overlay service network 470 for the multiple network domains, and a higher layer that may include an application network 480. Also shown in system 400 are a client device 402, one or more application server(s) 410, a first application (APP A) 404 and its associated first application server (APP A server) 414, and a second application (APP B) 406 and its associated second application server (APP B server) 416.

In various embodiments, client device 402 may be associated with any user, subscriber, user equipment (UE), employee, client, customer, electronic device, etc. wishing to initiate a flow in systems described herein. The terms 'client device', 'mobile device', 'UE device', 'UE', 'subscriber', 'user', and variations thereof are inclusive of any device used to initiate a communication, such as a computer, a vehicle, train, boat, airplane, drone, and/or any other transportation related device having electronic devices configured thereon, an electronic device such as a parking meter, vending machine, industrial device, automation device, enterprise device, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within systems described herein. Client devices discussed herein may also be inclusive of a suitable interface to a human user such as a microphone, a display, a keyboard, or other terminal equipment. Client devices discussed herein may also be any device that seeks to initiate a communication on behalf of another entity or element such as a program, a database, or any other component, device, element, or object capable of initiating an exchange within systems described herein. It is to be understood that any number of client devices may be present in systems described herein.

Application network 480 (also referred to herein as 'application network layer' and/or 'application layer network') may include an application network policy controller 482. Application network 480, including application network policy controller 482, may be managed and operated by an enterprise (e.g., enterprise 114) associated with multi-managed heterogeneous network 420.

Network resources associated with access service network 460 and overlay service network 470 may provide network connectivity (generally illustrated as bold-line arrows 421) between client device 402, one or more respective applications operating thereon (e.g., applications 404 and 406) and one or more respective applications server(s) 410 (e.g., application servers 414 and 416) associated with each respective application.

In general, an overlay service network may include at least one policy controller and associated network resources for each of one or more network domains. For example, overlay service network 470 may include at least one enterprise domain policy controller 472 and associated enterprise network resources 474 (e.g., for an enterprise network such as enterprise network 100 associated with enterprise 114) and may also include at least one non-enterprise domain policy controller 476 and associated non-enterprise network resources 478 (e.g., for a non-enterprise network such as private mobile network 200').

In general, an access service network may include network resources for different accesses (wired and/or wireless) that may be associated with each network domain of the overlay service network. For example, access service network 460 may include, on a per-domain basis, access nodes 462, backhaul and/or transport (backhaul/transport) nodes 464, and peering nodes 466 for each network domain (enterprise and non-enterprise) of overlay service network 470.

In general, access nodes 462 may include Wi-Fi access nodes, cellular access nodes, wired access nodes/gateways, combinations thereof, and/or the like and may provide connectivity to respective backhaul/transport nodes 464 of the respective network domains. Backhaul/transport nodes 464 may provide connectivity between access nodes 462 and peering nodes 466 of the respective network domains. Peering nodes 466 may provide connectivity between access service network 460 and the overlay service network 470 for the respective network domains.

In various embodiments, a non-enterprise network domain may be inclusive of any service provider type network, which may include a mobile core network service provider and/or operator, a cloud service provider, a third-party service provider, combinations thereof, and/or the like.

As discussed in further detail below, system 400 may facilitate a trusted mechanism to exchange service qualifier-related information and context information (e.g., measurements, etc.) between enterprise and non-enterprise network domains to expose such information to application network policy controller 482. In one instance, the mechanism may include request methods for specific measurement actions related to service to gather service qualifiers and context information from the network domains by the enterprise via application network policy controller 482. Logic provided via application network policy controller 482 may analyze the service qualifiers and context information from the network domains to determine a value of the service quality that can be achieved by each of the managed network domains (e.g., calculating a service metric for each domain based on the exposed information).

Using service information for an application or service, application network policy controller 482 can, in at least one embodiment, provide a decision making capability such that, for an application having a service level associated with a give quality 'X', at least one network domain can be identified to provide optimized network connectivity between the application and its associated application server. The application network policy controller 482 can generate an application policy that can be communicated to each network domain (e.g., to the policy controller of each network domain and further to various network resources thereof) to facilitate optimized network connectivity for the application.

In some embodiments, application network policy controller 482 may identify one or more network domains to provide network connectivity for an application of varying quality if the desired service level for an application is not available/achievable. In still some embodiments, the identification of one or more network domains to provide optimized network connectivity can be extended to determinations or decisions regarding whether degraded service is acceptable for a given application, time-of day decisions, service restriction decisions, and/or handoff decisions between different wireless technologies, among others.

Consider that different types of information may be associated with the different layers of multi-managed heterogeneous network 420 and may be exposed via policy controllers associated with enterprise and non-enterprise network domains for use by application network policy controller 482 to identify one or more network domains to provide optimized network connectivity between one or more respective applications operating on one or more client devices (e.g., client device 402) and one or more respective application servers.

Such information may include per-network domain service qualifiers that may generally include any combination authentication information, policy information, and/or routing information that may be exposed to application network policy controller 482 for each network domain. For example, service qualifiers such as authentication, policy, and routing information may be associated network resources of access service network 460 for each enterprise and non-enterprise network domain, whereas service qualifiers such as policy and routing information may be associated with network resources of overlay service network 470 for each enterprise and non-enterprise network domain.

Thus, service qualifiers for a given network domain may be associated with network resources of both overlay service network 470 and access service network 460.

In various embodiments, service qualifiers for a given network domain may include policy information associated with network resources for the network domain, SLA information associated with the network domain, security information and/or data sovereignty information associated with the network domain, authentication information (e.g., per device/subscriber) associated with the network domain, device identification information associated with the network domain, subscriber identification information associated with the network domain, combinations thereof, and/or the like.

Further, context information for each network domain may be exposed to application network policy controller 482. In general, context information for a network domain may characterize network resources of the domain (e.g., for both access service network 460 and overlay service network 470). In various embodiments, context information for a given network domain may include measurement information for network resources associated with the network domain, coverage information for network resources associated with the network domain (e.g., coverage information for access nodes, etc.), capacity information for network resources associated with the network domain, topology information for network resources associated with the network domain, combinations thereof, and/or the like.

In addition to network domain information that may be exposed via policy controllers 472 and 476, per-application service information associated with each of one or more applications may be determined by application network policy controller 482 for one or more applications (e.g., first application 404 and second application 406) that may be implemented in system 400. In various embodiments, service information for an application may include, one or more data types associated with the application (e.g., voice, video, text, etc.), one or more service levels associated with the application, one or more Quality of Service (QoS) profiles associated with the application, one or more latency profiles associated with the application, one or more bandwidth profiles associated with the application, one or more security policies (e.g., encrypted, known route, open path, etc.) one or more access network types associated with the application, one or more subscribers and/or devices authorized for the application, one or more subscribers and/or devices authorized for one or more operations associated with the application, combinations thereof, and/or the like.

Thus, information gathered and/or exposed to application network policy controller 482 may include any combination of per-network domain service qualifiers and context information that may be applicable to multiple network domains/layers, as well as per-application service information that may be applicable to multiple application. In particular, authentication information may be provided across multiple layers of multi-managed heterogeneous network 420 to facilitate authentication based on any combination of application, device/user, and/or access type. By providing for the ability to facilitate any level of authentication or service within system 400, any client device/client may access any access network that can be seen (e.g., sensed via wired and/or wireless communications) by the client device regardless of the client device/client having a subscription with a given service provider. Stated differently, a given client device/client does not need to have a pairwise relationship with each network domain that may be provided within a given multi-managed heterogeneous network in order to facilitate optimized network connectivity for one or more applications operating via the client device.

Using the exposed per-network domain service qualifiers and context information, as well as the per-application service information, application network policy controller 482 can identify one or more network domains to provide optimized network connectivity for a given application. Thus, the linkage of multiple overlay network domains' policy controllers to expose network context to an application network layer provides a technique to facilitate optimized path selection for an application.

Upon identifying the one or more network domains to provide network connectivity for an application, application network policy controller 482 can generate an application policy for the application and can communicate the application policy to the policy controllers of the enterprise and non-enterprise network domains of overlay service network 470 (e.g., enterprise domain policy controller 472 and non-enterprise domain policy controller 476) and can also communicate the application policy to client device 402. The policy controllers for each respective network domain of the overlay service network 470 can further communicate the application policy to the various per-domain network resources of the overlay service network 470 and of the access service network 460 to facilitate the optimized network connectivity for the application.

In various embodiments, an application policy can identify one or more of: one or more network locations at which an application server associated with an application may be instantiated, one or more service levels at which network connectivity for the application can be provided, a ranked list comprising a plurality of network domains to provide network connectivity for the application in which different network domains can provide network connectivity for the application based on different service levels associated with the application, one or more time of day policies associated with the application, one or more service restrictions identifying one or more operations of the application that cannot be performed for the application, combinations thereof, and/or the like. In various embodiments, service restrictions for an application may identify any combination of one or more network domains, one or more subscribers/users, one or more devices, one or more access network types, combinations thereof, and/or the like for which one or more operations of an application may not be performed.

Thus, optimized network connectivity may be provided for an application in a transparent manner such that access to the network domain(s) (e.g., based on various network conditions, policies, service levels, etc.) and connectivity across the network domain(s) to the application's server, which may include anchoring the application server at an optimal network location, can be provided without extraneous interactions/operations/etc. between the application and application network policy controller 482.

Consider an operational example involving first application 404 (APP A) and second application 406 (APP B). For the present example, consider that application network policy controller 482 determines, at 430, service information for each application 404 and 406. In various embodiments, service information may be determined from any combination of telemetry from first application 404 and/or first application server 414, second application 406 and/or second application server 416, network utilization, and/or server utilization. The service information may include any combination of authentication information and/or service quality information (e.g., service levels, QoS levels, latency information, etc.) associated with each application 404 and 406.

At 432a, application network policy controller 482 initiates a request for service qualifiers and context information for each network domain of overlay service network 470. The request is communicated to each respective network domain policy controller of overlay service network 470. For example, the request can be communicated to the at least one enterprise domain policy controller 472 and the at least one non-enterprise domain policy controller 474 of the overlay service network 470.

The request can further be communicated (not shown) from each respective network domain policy controller to respective network resources of overlay service network 470 for each respective (enterprise/non-enterprise) network domain and also communicated (as shown at 432b) to respective network resources of access service network 460 for each respective network domain. Each respective network domain policy controller may determine appropriate measurements, messaging, signaling, etc. to facilitate the request for service qualifiers and context information that is to be gathered from the various network resources associated with each respective network domain (e.g., using 3GPP request/response constructs, Application Programming Interface (API) calls/responses, etc.).

At 434a, service qualifiers and context information for respective network resources of each respective network domain of the access service network 460 are returned to each respective network domain policy controller. Service qualifiers and context information for respective network resources of each respective network domain of overlay service network 470 are also returned (not shown) to each respective network domain policy controller.

At 434b, each respective network domain policy controller returns the service qualifiers and context information gathered from the respective network resources of both the access service network 460 and the overlay service network 470 for each respective network domain to application network policy controller 482.

At 436, application network policy controller 482 analyzes the service qualifiers and context information for each respective network domain and also the service information for each application to identify one or more network domain(s) to provide optimized network connectivity for each application and generates an application policy for each application. In at least one embodiment, identifying one or more network domain(s) to provide optimized network connectivity for an application may include calculating a service metric for each respective network domain based on the service qualifiers and the context information exposed for each respective network domain and comparing the service metric for each of respective network domain to the service information for each application to identify the one or more network domains of the plurality of network domains to provide network connectivity for each application. By way of example only, one or more network domains may be identified by calculating/comparing service metrics and service information related to client to server latency, proximity (routed and/or physical), resource availability (e.g., compute and storage), combinations thereof, and/or the like.

At 438a, the application policies are communicated to each respective network domain policy controller, enterprise domain policy controller 472 and non-enterprise domain policy controller, for each respective network domain, and each respective network domain policy controller further communicates the application policies to respective network resources of overlay service network 470 and also communicates (as shown at 438b) the application policies to respective network resources of access service network 460 for each respective network domain.

At 438c, the application policies can also be communicated to client device 402 (e.g., via a given network domain/access). Thus, the application network 480 layer can also extend into the client device 402 to assist with per-application policy and path selection, now with network knowledge.

Accordingly, as illustrated by system 400 interfacing the policy (e.g., application policies) of application network 480 with multiple network domains of multi-managed heterogeneous network 420 may be used to facilitate and/or create new models of operation. In some instances, as discussed in further detail herein, application network 480 may be considered an SD-WAN layer in which the application network policy controller is implemented as an SD-WAN policy controller that can utilize the hooks described herein to build-up the context of the overlay service network 470 and also extend into the client device to assist with per-application policy and path selection based on various network knowledge.

Figure 5:
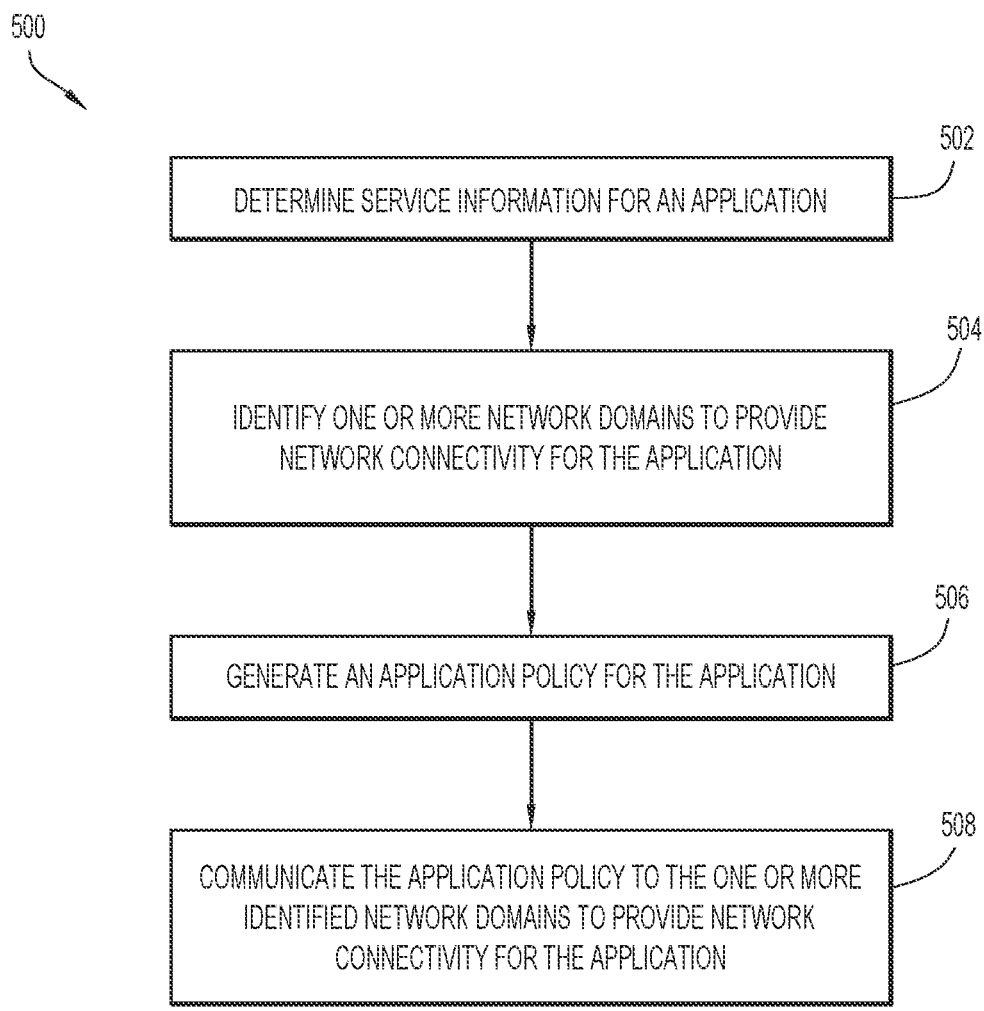
FIG. 5 is a flow chart depicting a method according to an example embodiment.

Referring to FIG. 5, FIG. 5 is a flow chart depicting a method 500 according to an example embodiment. In at least one embodiment, method 500 may be performed by an application policy controller, such as application network policy controller 482 or an SD-WAN policy controller.

At 502, the application network policy controller may determine service information for an application, wherein the application is to communicate with an application server. At 504, the application network policy controller may identify one or more network domains of a plurality of network domains to provide network connectivity between the application and the application server based, at least in part, on service qualifiers for each of the plurality of network domains, context information that characterizes network resources for each of the plurality of network domains, and the service information for the application. The network domains may include at least one enterprise network domain and at least one non-enterprise network domain. Each network domain may include at least one policy controller in communication with network resources of each network domain. The application network policy controller may be associated with or managed by at least one enterprise domain and may be in communication with each policy controller of each network domain.

At 506, the application network policy controller may generate an application policy for the application in which the application policy identifies, at least in part, the one or more network domains to provide network connectivity between the application and the application server. At 508, the application network policy controller may communicate the application network policy to the one or more identified network domains to provide network connectivity between the application and the application server.

Figure 6:
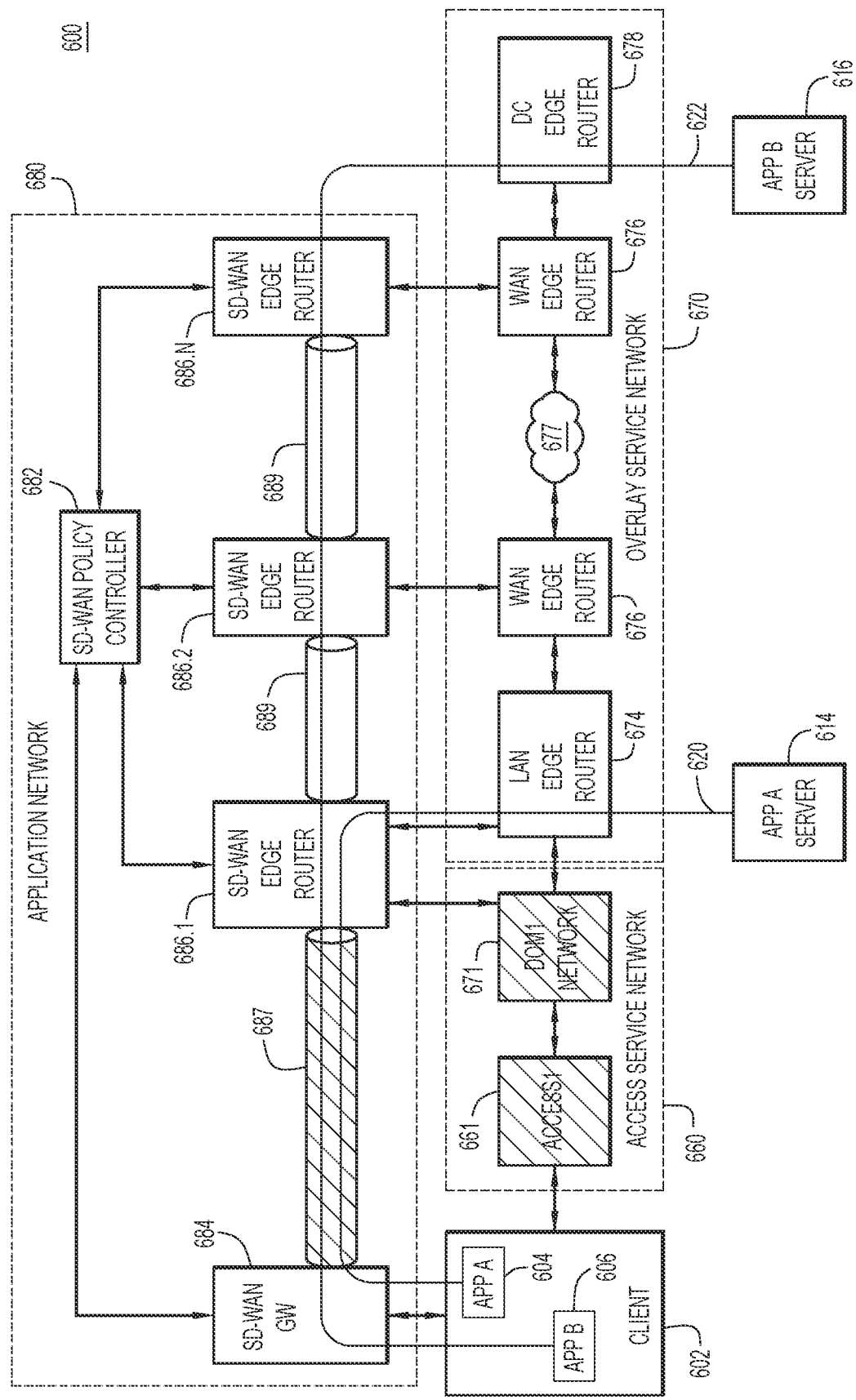
FIGS. 6-8 are block diagrams illustrating other systems in which optimal network connectivity may be provided for applications across a multi-managed heterogeneous network, according to example embodiments.
Figure 7:
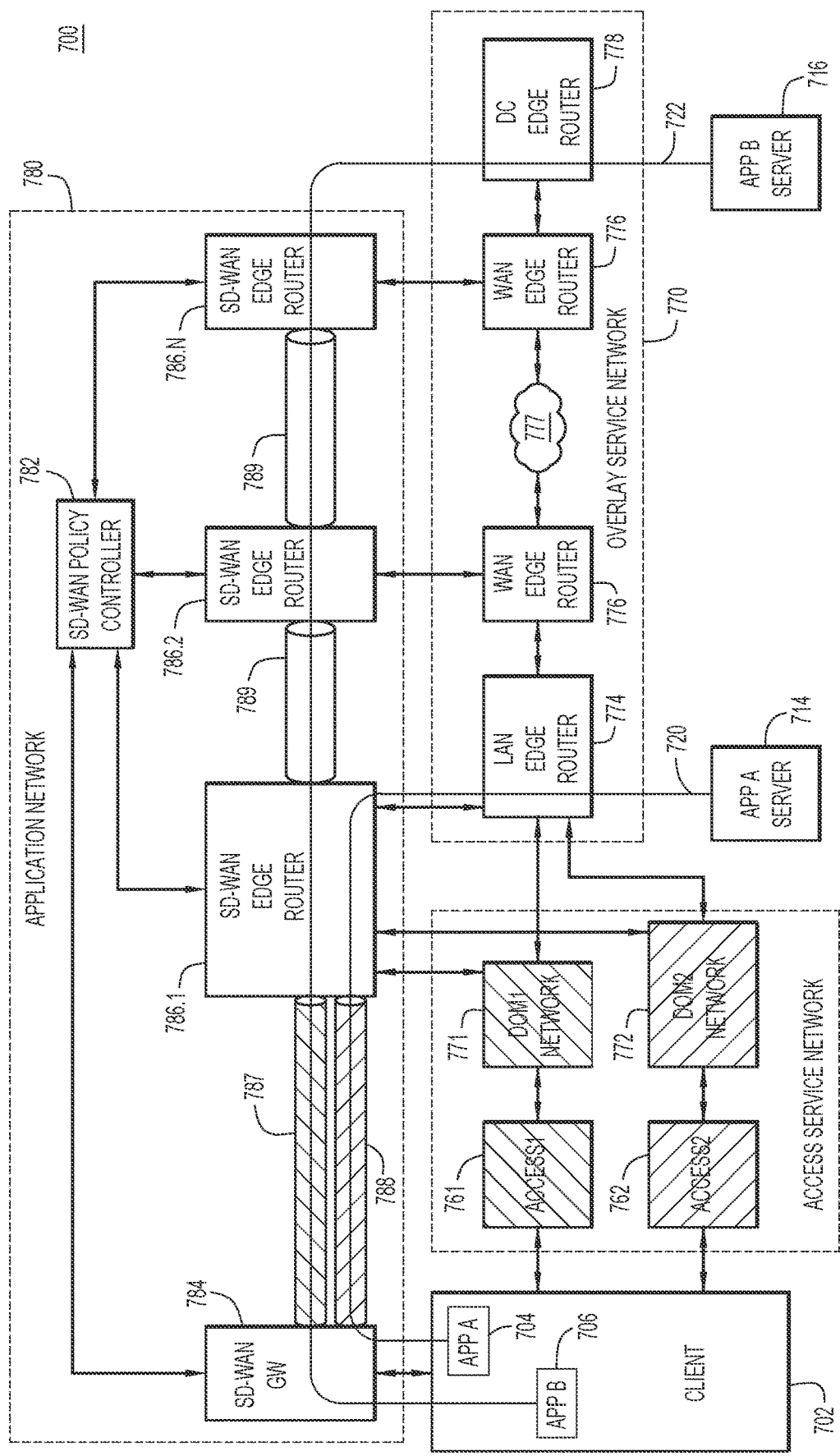
Figure 8:
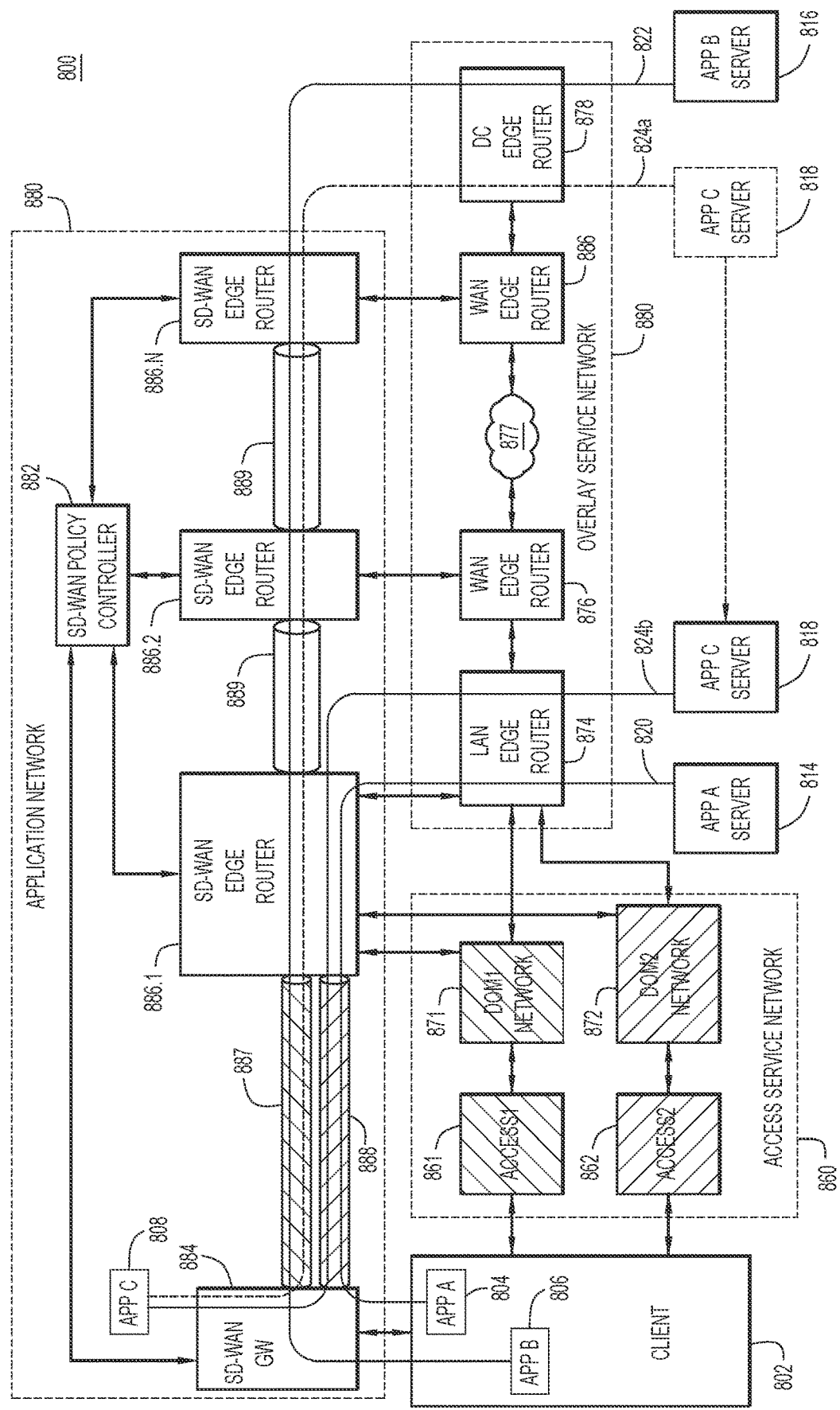

Referring to FIGS. 6-8, FIGS. 6-8 are block diagrams illustrating another systems in which optimal network connectivity may be provided for applications across a multi-managed heterogeneous network, according to example embodiments. In some implementations, an application network may be considered an SD-WAN layer in which an application network policy controller may be is implemented as an SD-WAN policy controller that can build-up the context of various network domains in order to define how a client device and an SD-WAN end point may enforce derived application policies of individual applications.

Consider system 600, as shown in FIG. 6, which may include a client device 602, an access service network 660, an overlay service network 670, and an application network 680. Client device 602 may be configured with a first application 604 (APP A) and a second application 606 (APP B). The first application 604 may connect with a first application server 614 (APP A Server) and the second application 606 may connect with a second application server 616 (APP B Server).

A first network domain (DOM1) is configured for system 600 that includes first access network resources 661 (Access1) and first network resources 671 (DOM1 NTWK). Consider for system 600 that an enterprise manages the network resources for the first network domain (661, 671), various edge routers for overlay service network 670, and application network 780.

First network resources 671 of the first network domain may interface with various edge routers managed by the enterprise, including local network resources for the enterprise such as a LAN edge router 674, which may interface with one or more WAN edge routers 676 that may be connected via a network 677 and may further interface with central network resources for the enterprise, such as a DC edge router 678.

Application network 680 may include an SD-WAN policy controller 682 (e.g., an application network policy controller), an SD-WAN gateway (GW) 684 and various SD-WAN edge routers 686.1-686.N. SD-WAN GW 684 may interface with a given SD-WAN edge router 686.1 via a mobile SD-WAN tunnel 687 that may be associated with network connectivity facilitated via the first network domain network resources. SD-WAN edge router 686.1 may further interface with additional SD-WAN edge routers 686.2-686.N via additional mobile SD-WAN tunnels 689 of application network 680. For system 600, the network topology of the SD-WAN edge routers 686.1-686.N delivers the routing capabilities that are exposed into the SD-WAN policy controller 682 to define how the client device 602 and/or an SD-WAN end point, such as SD-WAN GW 684 in this example, enforce derived application policies of the first application 604 and the second application 606 to provide, at least in part, optimized network connectivity for each individual application. In at least one embodiment, SD-WAN GW 684 may be implemented as a Cisco® AnyConnect Secure Mobility Client, a Virtual Private Network (VPN) client, or the like.

For system 600, a first application policy may be generated by SD-WAN policy controller 682 to provide a first service allocation such that local routing via LAN edge router 674 may provide a first optimized path 620 to facilitate network connectivity between first application 604 and first application server 614 in which the first application server is instantiated (e.g., installed, configured, etc.) proximate to LAN edge router 674. Stated differently, the first application server 614 may be anchored to LAN edge router 674. Additionally, a second application policy may be generated by SD-WAN policy controller 682 to provide a second service allocation such that central routing via DC edge router 678 may provide a second optimized path 622 to facilitate network connectivity between second application 606 and second application server 616 in which the second application server 616 is instantiated or anchored proximate to DC edge router 678.

Further, consider system 700, as shown in FIG. 7, which may include a client device 702, an access service network 760, an overlay service network 770, and an application network 780. Client device 702 may be configured with a first application 704 (APP A) and a second application 706 (APP B). The first application 704 may connect with a first application server 714 (APP A Server) and the second application 706 may connect with a second application server 716 (APP B Server).

A first network domain (DOM1) is configured for system 700 that includes first access network resources 761 (Access1) and first network resources 771 (DOM1 NTWK). A second network domain (DOM2) is also configured for system 700 that includes second access network resources 762 (Access2) and second network resources 772 (DOM2 NTWK). Consider for system 700 that an enterprise manages the network resources for the first network domain (761, 771), various edge routers for overlay service network 770, and application network 780; whereas, a non-enterprise provider (e.g., a mobile core service provider, a cloud service provider, etc.) manages network resources (762, 772) for the second network domain.

First network resources 771 of the first network domain and second network resources 772 of the second network domain may interface with various edge routers managed by the enterprise, including local network resources for the enterprise such as a LAN edge router 774, which may interface with one or more WAN edge routers 776 that may be connected via a network 777 and may further interface with central network resources for the enterprise, such as a DC edge router 778.

Application network 780 may include an SD-WAN policy controller 782 (e.g., an application network policy controller), an SD-WAN GW 784 and various SD-WAN edge routers 786.1-786.N. SD-WAN GW 784 may interface with a given SD-WAN edge router 786.1 via a first mobile SD-WAN tunnel 787 that may be associated with network connectivity facilitated via the first network domain network resources 761, 771. SD-WAN GW 784 may also interface with SD-WAN edge router 786.1 via a second mobile SD-WAN tunnel 788 that may be associated with network connectivity facilitated via the second domain network resources 762, 772. SD-WAN edge router 786.1 may further interface with additional SD-WAN edge routers 786.2-786.N via additional mobile SD-WAN tunnels 789 of application network 780. For system 700, the network topology of the SD-WAN edge routers 786.1-786.N delivers the routing capabilities that are exposed into the SD-WAN policy controller 782 to define how the client device 702 and/or SD-WAN GW 784, enforce derived application policies of the first application 704 and the second application 706 to provide, at least in part, optimized network connectivity for each individual application. In at least one embodiment, SD-WAN GW 784 may be implemented as a Cisco® AnyConnect Secure Mobility Client, a Virtual Private Network (VPN) client, or the like.

Given the topology of multiple access networks, which is the more regular SD-WAN use case, and exposure of network context (e.g., service qualifiers and context information) and application service information into the application (SD-WAN) network 780, application policies generated by SD-WAN policy controller 782 can be used to enforce per-application access method selections for the first application 704 and the second application 706.

For example, a first application policy may be generated by SD-WAN policy controller 782 to provide a first service allocation such that local routing via LAN edge router 774 may provide a first optimized path 720 via the second domain access and network resources 762, 772 to facilitate network connectivity between first application 704 and first application server 714 in which the first application server is instantiated or anchored proximate to LAN edge router 774. Additionally, a second application policy may be generated by SD-WAN policy controller 782 to provide a second service allocation such that central routing via DC edge router 778 may provide a second optimized path 722 via the first domain access and network resources 761, 771 to facilitate network connectivity between second application 706 and second application server 716 in which the second application server 716 is instantiated or anchored proximate to DC edge router 778.

Further, consider system 800, as shown in FIG. 8, which may include a client device 802, an access service network 860, an overlay service network 870, and an application network 880. Client device 802 may be configured with a first application 804 (APP A) and a second application 806 (APP B). A third application 808 (APP C) is an additional application illustrated for system 800. In various embodiments, third application 808 may be configured within application network 880, for one or more other client devices, combinations thereof, and/or the like. The first application 804 may connect with a first application server 814 (APP A Server), the second application 806 may connect with a second application server 816 (APP B Server), and the third application 808 may connect with a third application server 818 (APP C Server).

A first network domain (DOM1) is configured for system 800 that includes first access network resources 861 (Access1) and first network resources 871 (DOM1 NTWK). A second network domain (DOM2) is also configured for system 800 that includes second access network resources 862 (Access2) and second network resources 872 (DOM2 NTWK). Consider for system 800 that an enterprise manages the network resources for the first network domain (861, 871), various edge routers for overlay service network 870, and application network 880; whereas, a non-enterprise provider (e.g., a mobile core service provider, a cloud service provider, etc.) manages network resources (862, 872) for the second network domain.

First network resources 871 of the first network domain and second network resources 872 of the second network domain may interface with various edge routers managed by the enterprise, including local network resources for the enterprise such as a LAN edge router 874, which may interface with one or more WAN edge routers 876 that may be connected via a network 877 and may further interface with central network resources for the enterprise, such as a DC edge router 878.

Application network 880 may include an SD-WAN policy controller 882 (e.g., an application network policy controller), an SD-WAN GW 884 and various SD-WAN edge routers 886.1-886.N. SD-WAN GW 884 may interface with a given SD-WAN edge router 886.1 via a first mobile SD-WAN tunnel 887 that may be associated with network connectivity facilitated via the first network domain network resources 861, 871. SD-WAN GW 884 may also interface with SD-WAN edge router 886.1 via a second mobile SD-WAN tunnel 888 that may be associated with network connectivity facilitated via the second domain network resources 862, 872. SD-WAN edge router 886.1 may further interface with additional SD-WAN edge routers 886.2-886.N via additional mobile SD-WAN tunnels 889 of application network 880. For system 800, the network topology of the SD-WAN edge routers 886.1-886.N delivers the routing capabilities that are exposed into the SD-WAN policy controller 882 to define how the client device 802 and/or SD-WAN GW 884 enforce derived application policies of the first application 804, the second application 806, and the third application 808 to provide, at least in part, optimized network connectivity for each individual application. In at least one embodiment, SD-WAN GW 884 may be implemented as a Cisco® AnyConnect Secure Mobility Client, a Virtual Private Network (VPN) client, or the like.

A further aspect of the application level policy service allocation techniques described herein may include the application network 880 enabling flexible placement or anchoring of an application server. A key use case for enabling flexible placement of an application server is to enable processing application data closer to a consumer or client device, which may be provided for various reasons including, but not limited to: providing for more efficient usage of network resources (e.g., not having to transfer all data for a given application to a central location); providing data security and/or sovereignty (e.g., to ensure that data associated with a given application does not leave a given network location/area/facility/etc.); permitting localized interaction for a given application to facilitate faster and/or improved engagement; combinations thereof; and/or the like.

For example, a third application policy associated with third application (APP C) 808 may be generated and/or updated by SD-WAN policy controller 882 to provide a service reallocation for relocating third application server 818 from being anchored at DC edge router 878 to being anchored at LAN edge router 874. Further, the third application policy may provide a service reallocation for moving a first path 824a associated with network connectivity provided via the first network domain network resources 861, 871 to a second optimized path 824b associated with network connectivity provided via the second network domain network resources 862, 872. Thus, embodiments herein may provide for flexible placement and network connectivity for an application server across multiple network domains.

Also provided for system 800, a first application policy may be generated by SD-WAN policy controller 882 to provide a first service allocation such that local routing via LAN edge router 874 may provide an optimized path 820 via the second domain access and network resources 862, 872 to facilitate network connectivity between first application 804 and first application server 814 in which the first application server is anchored proximate to LAN edge router 874. Further, a second application policy may be generated by SD-WAN policy controller 882 to provide a second service allocation such that central routing via DC edge router 878 may provide an optimized path 822 via the first domain access and network resources 861, 871 to facilitate network connectivity between second application 806 and second application server 816 in which the second application server 816 is anchored proximate to DC edge router 878.

In summary, techniques presented herein illustrate that interfacing the policy of an application network layer with multiple network domains of a multi-managed heterogeneous network may be used to facilitate and/or create new models of operation. With the increasing amount of overlay networking models, techniques presented herein provide for the exposure of network capabilities and policies that can be applied across multi-managed heterogeneous networks including multiple network domains in order to provide the opportunity to innovate and differentiate client to cloud networking capabilities.

Figure 9:
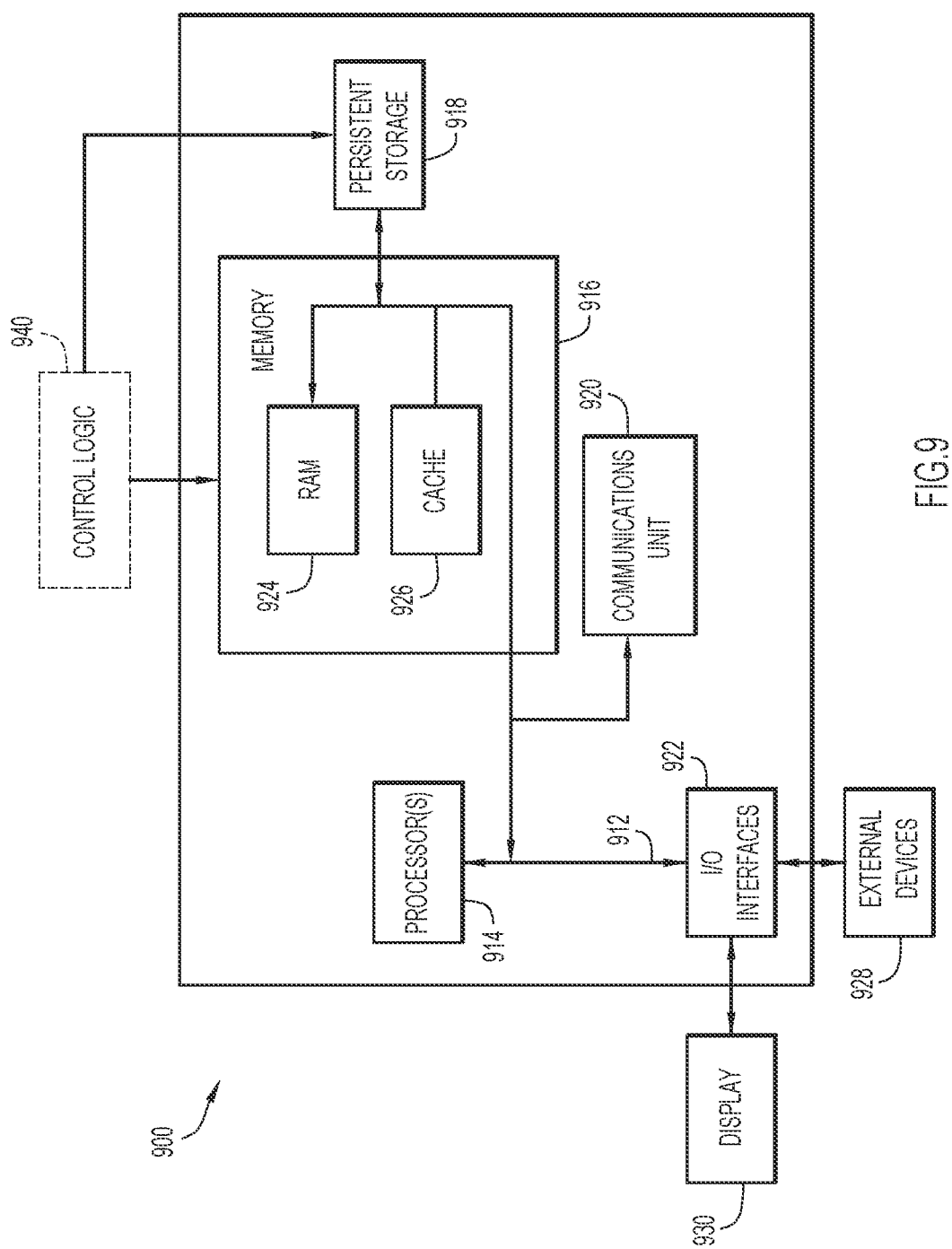
FIG. 9 is a hardware block diagram of a computing device that may perform functions for providing service allocation across a multi-managed heterogeneous network, in connection with the techniques depicted in FIGS. 4-8.

Referring to FIG. 9, FIG. 9 illustrates a hardware block diagram of a computing device 900 that may perform the functions of an application network policy controller (e.g., application network policy controller 482 and SD-WAN policy controllers 682, 782, and 882), referred to herein in connection with FIGS. 4-8. It should be appreciated that FIG. 9 provides only an illustration of one embodiment and does not imply any limitations with regard to the environments in which different embodiments may be implemented. Many modifications to the depicted environment may be made.

As depicted, computing device 900 includes a bus 912, which provides communications between computer (e.g., hardware) processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media, which can be inclusive on non-transitory computer readable storage media. In the depicted embodiment, memory 916, which may be inclusive of one or more memory element(s), may include random access memory (RAM) 924 and cache memory 926. In general, memory 916 can include any suitable volatile or non-volatile computer readable storage media. Instructions for control logic 940 may be stored in any combination of memory 916 and/or persistent storage 918 for execution by computer processor(s) 914. When the computer processor(s) 914 execute control logic 940, the computer processor(s) 914 are caused to perform the operations described above in connection with FIGS. 4-8.

One or more programs and/or other logic may be stored in persistent storage 918 for execution by one or more of computer processor(s) 914 via one or more memory element(s) of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. Communications unit 920 may provide communications through the use of either or both physical (e.g., wired) and wireless communications links.

I/O interface(s) 922, which may be inclusive of one or more network interface cards (NICs), allows for input and output of data with other devices that may be connected to computing device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 may provide a mechanism to display data to a user and may be, for example, a computer monitor.

In various embodiments, any of the other elements discussed herein in connection with FIGS. 4-8 (e.g., enterprise/non-enterprise domain policy controllers, network resources, routers, gateways, servers, client devices, etc.) may be configured with hardware, software, logic, and/or the like in a similar manner as illustrated for computing device 900, which may or may not be configured in combination with any other hardware, software, logic, and/or the like (e.g., Radio Frequency (RF) receivers, RF transmitters, RF transceivers, antennas, antenna arrays, baseband processors, etc.) in order to perform various operations as described herein.

In one form, a computer-implemented method is provided and may include determining, by an application network policy controller, service information for an application, wherein the application communicates with an application server; identifying one or more network domains of a plurality of network domains to provide network connectivity between the application and the application server based, at least in part, on service qualifiers for the plurality of network domains, context information that characterizes network resources for the plurality of network domains, and the service information for the application, wherein each network domain comprises at least one policy controller, wherein the plurality of network domains comprise at least one enterprise network domain and at least one non-enterprise network domain and the application network policy controller is associated with at least one enterprise network domain; generating an application policy for the application, wherein the application policy identifies, at least in part, the one or more network domains to provide network connectivity between the application and the application server; and communicating the application policy to the one or more identified network domains to provide network connectivity between the application and the application server.

In at least one embodiment, communicating the application policy to the one or more identified network domains may further include communicating the application policy to the at least one policy controller associated with each of the one or more identified network domains; and communicating the application policy to network resources for the one or more identified network domains.

In at least one embodiment, the method may include obtaining, by the at least one policy controller associated with each of the plurality of network domains, the service qualifiers and the context information from the network resources for each of the plurality of network domains; and obtaining, by the application network policy controller, the context information for the plurality of network domains from the at least one policy controller associated with each of the plurality of network domains. In at least one embodiment at least one of obtaining the service qualifiers and obtaining the context information is initiated by a request communicated from the application network policy controller to the at least one policy controller associated with each of the plurality of network domains.

In at least one embodiment, identifying one or more network domains of a plurality of network domains to provide network connectivity for the application may further include: calculating a service metric for each of the plurality of network domains based on the service qualifiers for the plurality of network domains and the context information that characterizes network resources for the plurality of network domains; and comparing the service metric for each of the plurality of network domains to the service information for the application to identify the one or more network domains of the plurality of network domains to provide network connectivity for the application.

In at least one embodiment, the communicating may further include communicating the application policy to one or more network elements associated with the application through which the application can be connected to the plurality of network domains. In at least one embodiment, the method may be performed for a plurality of applications, wherein each of the plurality of applications is associated with a corresponding application server.

In at least one embodiment, the service information for the application is associated with network resources that are to be allocated to provide network connectivity between the application and the application server. In at least one embodiment, service information for the application may include at least one of: one or more data types associated with the application; one or more service levels associated with the application; one or more Quality of Service (QoS) profiles associated with the application; one or more latency profiles associated with the application; one or more bandwidth profiles associated with the application; one or more access network types associated with the application; one or more security policies associated with the application; one or more subscribers and/or devices authorized for the application; and one or more subscribers and/or devices authorized for one or more operations associated with the application.

In at least one embodiment, the application policy may further identify at least one of: one or more network locations at which the application server may be instantiated; a ranked list comprising a plurality of network domains to provide network connectivity for the application, wherein different network domains can provide network connectivity for the application based on different service levels associated with the application; one or more service levels at which network connectivity for the application can be provided; one or more time of day policies associated with the application; and one or more service restrictions identifying one or more operations of the application that cannot be performed for at least one of: one or more network domains; one or more subscribers; one or more devices; and one or more access network types.

In at least one embodiment, the service qualifiers for the plurality of network domains may include one or more of: policy information associated with network resources for the plurality of network domains; service level agreement information associated with the plurality of network domains; security information associated with the plurality of network domains; authentication information associated with the plurality of network domains; device identification information associated with the plurality of network domains; and subscriber identification information associated with the plurality of network domains.

In at least one embodiment, the context information may include one or more of: measurement information for network resources associated with the plurality of network domains; coverage information for network resources associated with the plurality of network domains; capacity information for network resources associated with the plurality of network domains; and topology information for network resources associated with the plurality of network domains.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN) (e.g., Wi-Fi, etc.), Ethernet network, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Ethernet network, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining, by an application network policy controller, service information for an application, wherein the application communicates with an application server;
   identifying one or more network domains of a plurality of network domains to provide network connectivity between the application and the application server based, at least in part, on service qualifiers for the plurality of network domains, context information that characterizes service quality that is provided by network resources for each of the plurality of network domains, and the service information for the application, wherein each network domain comprises at least one policy controller, wherein the plurality of network domains comprise at least one enterprise network domain and at least one non-enterprise network domain and the application network policy controller is associated with at least one enterprise network domain, and wherein the context information comprises measurement information and capacity information for the network resources for each of the plurality of network domains;
   generating an application policy for the application, wherein the application policy identifies, at least in part, the one or more network domains to provide network connectivity between the application and the application server; and
   communicating the application policy to the one or more identified network domains to provide network connectivity between the application and the application server.

2. The method of claim 1, wherein communicating the application policy to the one or more identified network domains further comprises:
   communicating the application policy to the at least one policy controller associated with each of the one or more identified network domains; and
   communicating the application policy to network resources for the one or more identified network domains.

3. The method of claim 1, further comprising:
   obtaining, by the at least one policy controller associated with each of the plurality of network domains, the service qualifiers and the context information from the network resources for each of the plurality of network domains; and
   obtaining, by the application network policy controller, the context information for the plurality of network domains from the at least one policy controller associated with each of the plurality of network domains.

4. The method of claim 3, wherein at least one of obtaining the service qualifiers and obtaining the context information is initiated by a request communicated from the application network policy controller to the at least one policy controller associated with each of the plurality of network domains.

5. The method of claim 1, wherein identifying one or more network domains of a plurality of network domains to provide network connectivity for the application further comprises:
   calculating a service metric for each of the plurality of network domains based on the service qualifiers for the plurality of network domains and the context information that characterizes the service quality that is provided by network resources for each of the plurality of network domains; and comparing the service metric for each of the plurality of network domains to the service information for the application to identify the one or more network domains of the plurality of network domains to provide network connectivity for the application.

6. The method of claim 1, wherein the communicating further comprises communicating the application policy to one or more network elements associated with the application through which the application can be connected to the plurality of network domains.

7. The method of claim 1, wherein the method is performed for a plurality of applications, wherein each of the plurality of applications is associated with a corresponding application server.

8. The method of claim 1, wherein the service information for the application is associated with network resources that are to be allocated to provide network connectivity between the application and the application server.

9. The method of claim 8, wherein the service information for the application comprises at least one of:
one or more data types associated with the application;
one or more service levels associated with the application;
one or more Quality of Service (QoS) profiles associated with the application;
one or more latency profiles associated with the application;
one or more bandwidth profiles associated with the application;
one or more access network types associated with the application;
one or more security policies associated with the application;
at least one of one or more subscribers and devices authorized for the application; and
at least one of one or more subscribers and devices authorized for one or more operations associated with the application.

10. The method of claim 1, wherein the application policy further identifies at least one of:
one or more network locations at which the application server may be instantiated;
a ranked list comprising a plurality of network domains to provide network connectivity for the application, wherein different network domains can provide network connectivity for the application based on different service levels associated with the application;
one or more service levels at which network connectivity for the application can be provided;
one or more time of day policies associated with the application; and
one or more service restrictions identifying one or more operations of the application that cannot be performed for at least one of:
one or more network domains;
one or more subscribers;
one or more devices; and
one or more access network types.

11. The method of claim 1, wherein the service qualifiers for the plurality of network domains comprises one or more of:
policy information associated with network resources for the plurality of network domains;
service level agreement information associated with the plurality of network domains;
security information associated with the plurality of network domains;
authentication information associated with the plurality of network domains;
device identification information associated with the plurality of network domains; and
subscriber identification information associated with the plurality of network domains.

12. The method of claim 1, wherein the context information further comprises one or more of:
coverage information for network resources associated with the plurality of network domains; and
topology information for network resources associated with the plurality of network domains.

13. One or more non-transitory computer readable storage media encoded with instructions that, when executed by a processor, cause the processor to perform operations, comprising:
determining, by an application network policy controller, service information for an application, wherein the application communicates with an application server;
identifying one or more network domains of a plurality of network domains to provide network connectivity between the application and the application server based, at least in part, on service qualifiers for the plurality of network domains, context information that characterizes service quality that is provided by network resources for each of the plurality of network domains, and the service information for the application, wherein each network domain comprises at least one policy controller, wherein the plurality of network domains comprise at least one enterprise network domain and at least one non-enterprise network domain and the application network policy controller is associated with at least one enterprise network domain, and wherein the context information comprises measurement information and capacity information for the network resources for each of the plurality of network domains;
generating an application policy for the application, wherein the application policy identifies, at least in part, the one or more network domains to provide network connectivity between the application and the application server; and
communicating the application policy to the one or more identified network domains to provide network connectivity between the application and the application server.

14. The media of claim 13, wherein communicating the application policy to the one or more identified network domains further comprises:
communicating the application policy to the at least one policy controller associated with each of the one or more identified network domains; and
communicating the application policy to network resources for the one or more identified network domains.

15. The media of claim 13, further comprising:
obtaining, by the at least one policy controller associated with each of the plurality of network domains, the service qualifiers and the context information from the network resources for each of the plurality of network domains; and
obtaining, by the application network policy controller, the context information for the plurality of network domains from the at least one policy controller associated with each of the plurality of network domains.

16. The media of claim 15, wherein at least one of obtaining the service qualifiers and obtaining the context information is initiated by a request communicated from the application network policy controller to the at least one policy controller associated with each of the plurality of network domains.

17. The media of claim 13, wherein identifying one or more network domains of a plurality of network domains to provide network connectivity for the application further comprises:
  calculating a service metric for each of the plurality of network domains based on the service qualifiers for the plurality of network domains and the context information that characterizes the service quality that is provided by network resources for each of the plurality of network domains; and
  comparing the service metric for each of the plurality of network domains to the service information for the application to identify the one or more network domains of the plurality of network domains to provide network connectivity for the application.

18. A system comprising:
  at least one memory element for storing data; and
  at least one processor for executing instructions associated with the data, wherein executing the instructions causes the system to perform operations, comprising:
    determining, by an application network policy controller, service information for an application, wherein the application communicates with an application server;
    identifying one or more network domains of a plurality of network domains to provide network connectivity between the application and the application server based, at least in part, on service qualifiers for the plurality of network domains, context information that characterizes service quality provided by network resources for each of the plurality of network domains, and the service information for the application, wherein each network domain comprises at least one policy controller, wherein the plurality of network domains comprise at least one enterprise network domain and at least one non-enterprise network domain and the application network policy controller is associated with at least one enterprise network domain, and wherein the context information comprises measurement information and capacity information for the network resources for each of the plurality of network domains;
    generating an application policy for the application, wherein the application policy identifies, at least in part, the one or more network domains to provide network connectivity between the application and the application server; and
    communicating the application policy to the one or more identified network domains to provide network connectivity between the application and the application server.

19. The system of claim 18, wherein communicating the application policy to the one or more identified network domains further comprises:
  communicating the application policy to the at least one policy controller associated with each of the one or more identified network domains; and
  communicating the application policy to network resources for the one or more identified network domains.

20. The system of claim 18, wherein identifying one or more network domains of a plurality of network domains to provide network connectivity for the application further comprises:
  calculating a service metric for each of the plurality of network domains based on the service qualifiers for the plurality of network domains and the context information that characterizes the service quality that is provided by network resources for each of the plurality of network domains; and
  comparing the service metric for each of the plurality of network domains to the service information for the application to identify the one or more network domains of the plurality of network domains to provide network connectivity for the application.

* * * * *